United States Patent
Bai et al.

(10) Patent No.: US 11,049,230 B2
(45) Date of Patent: Jun. 29, 2021

(54) FEATURE-BASED IMAGE PROCESSING USING FEATURE IMAGES EXTRACTED FROM DIFFERENT ITERATIONS

(71) Applicant: KONINKLIJKE PHILIPS N.V., Eindhoven (NL)

(72) Inventors: Chuanyong Bai, Solon, OH (US); Andriy Andreyev, Willoughby Hills, OH (US); Bin Zhang, Cleveland, OH (US); Yang-Ming Zhu, Solon, OH (US); Xiyun Song, Cupertino, CA (US); Jinghan Ye, Livermore, CA (US); Zhiqiang Hu, Twinsburg, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 152 days.

(21) Appl. No.: 16/325,213

(22) PCT Filed: Aug. 22, 2017

(86) PCT No.: PCT/EP2017/071175
§ 371 (c)(1),
(2) Date: Feb. 13, 2019

(87) PCT Pub. No.: WO2018/037024
PCT Pub. Date: Mar. 1, 2018

(65) Prior Publication Data
US 2019/0197674 A1    Jun. 27, 2019

Related U.S. Application Data

(60) Provisional application No. 62/377,844, filed on Aug. 22, 2016.

(51) Int. Cl.
*G06T 11/00* (2006.01)
*G06T 5/50* (2006.01)
*G06K 9/62* (2006.01)

(52) U.S. Cl.
CPC .............. *G06T 5/50* (2013.01); *G06K 9/6232* (2013.01); *G06T 11/006* (2013.01);
(Continued)

(58) Field of Classification Search
CPC ....... G06T 5/50; G06T 11/006; G06T 11/008; G06T 2207/20221; G06T 2207/20224; G06T 2211/424; G06K 9/6232
See application file for complete search history.

(56) References Cited

U.S. PATENT DOCUMENTS 6,249,693 B1    6/2001  Cline et al.
2007/0110294 A1  5/2007  Schaap et al.
(Continued)

FOREIGN PATENT DOCUMENTS

WO    2016/042466 A2    3/2016

OTHER PUBLICATIONS

Hu et al: "A feature refinement approach for statistical interior CT reconstruction", Physics in Medicine and Biology, Institute of Physics Publishing, Bristol GB, vol. 61, No. 14, Jun. 30, 2016.

*Primary Examiner* — Andrew W Johns

(57) ABSTRACT

Image processing performed by a computer (22) includes iterative image reconstruction or refinement (26, 56) that produces a series of update images ending in an iteratively reconstructed or refined image. A difference image (34, 64) is computed between a first update image (30, 60) and a second update image (32, 62) of the series. The difference image is converted to a feature image (40) and is used in the iterative processing (26, 56) or in post-processing (44) performed on the iteratively reconstructed or refined images or images from different reconstruction or refinement techniques. In another embodiment, first and second image reconstructions (81, 83) are performed to generate respective first and second reconstructed images (80, 82). A
(Continued)

difference image (84) is computed between two images each selected from the group: the first reconstructed image, an update image of the first reconstruction, the second reconstructed image, and an update image of the second reconstruction. A feature image is generated from the difference image and used to combine the first and second reconstructed images.

24 Claims, 8 Drawing Sheets

(52) U.S. Cl.
CPC .. *G06T 11/008* (2013.01); *G06T 2207/10104* (2013.01); *G06T 2207/10108* (2013.01); *G06T 2207/20221* (2013.01); *G06T 2207/20224* (2013.01); *G06T 2211/424* (2013.01)

(56) References Cited

U.S. PATENT DOCUMENTS

| | | | |
|---|---|---|---|
| 2012/0106815 A1* | 5/2012 | Yang et al. | G06T 7/0012 |
| | | | 382/131 |
| 2014/0270440 A1 | 9/2014 | Inglese et al. | |
| 2016/0171723 A1* | 6/2016 | Claus et al. | G06T 11/006 |
| | | | 382/131 |
| 2016/0327622 A1* | 11/2016 | Ahn et al. | G01T 1/2985 |
| 2018/0182133 A1* | 6/2018 | Tanaka | G06T 11/006 |

* cited by examiner

FEATURE-BASED IMAGE PROCESSING USING FEATURE IMAGES EXTRACTED FROM DIFFERENT ITERATIONS

CROSS REFERENCE TO RELATED APPLICATIONS

This application is the U.S. National Phase application under 35 U.S.C. § 371 of International Application No. PCT/EP2017/071175 filed Aug. 22, 2017, published as WO 2018/037024 on Mar. 1, 2018, which claims the benefit of U.S. Provisional Patent Application No. 62/377,844 filed Aug. 22, 2016. These applications are hereby incorporated by reference herein.

FIELD

The following relates generally to the image processing arts, image reconstruction arts, magnetic resonance (MR) imaging and image reconstruction and refinement arts, nuclear emission imaging and image reconstruction and refinement arts, computed tomography (CT) imaging and image reconstruction and refinement arts, and related arts.

BACKGROUND

Medical imaging is performed using various imaging modalities. Nuclear emission imaging modalities such as positron emission tomography (PET) or single photon emission computed tomography (SPECT) provide for functional imaging of take-up and/or distribution of a radiopharmaceutical in tissue or organs. Transmission computed tomography (CT) or magnetic resonance (MR) imaging are typically used to image anatomical features, although additional information may be obtained using these techniques in conjunction with a contrast agent or advanced contrast techniques, e.g. time-of-flight magnetic resonance angiography (TOF-MRA).

In these techniques, the acquired imaging data generally do not directly form a cognizable image. In PET, the imaging data are lines of response (LORs) defined by detected 511 keV gamma ray pairs, optionally with time-of-flight (TOF) localization. SPECT data are generally collected as linear or narrow-angle conical projections defined by a honeycomb or other type of collimator, while CT data are projections (here absorption line integrals) along paths from x-ray tube to detector element. MR data are generally acquired as k-space data in a Cartesian, radial, spiral, or other acquisition geometry. In any of these cases, a suitable image reconstruction algorithm is applied to convert the imaging data from projection space or k-space to a reconstructed image in two-dimensional (2D) or three-dimensional (3D) image space. Image reconstruction is typically an iterative process, although non-iterative reconstruction algorithms such as filtered backprojection are also known. Various image refinement algorithms, such as filters and/or iterative resolution recovery, may optionally be applied to the reconstructed image to enhance salient characteristics.

A challenge in the image reconstruction and refinement processing is the balancing of noise suppression and edge preservation (or edge enhancement). These goals tend to be in opposition, since noise constitutes unwanted image contrast that is to be suppressed; whereas edges constitute desired image contrast that is to be retained or perhaps even enhanced. Post-reconstruction filtering is a primary approach for noise suppression in medical imaging, but requires careful selection of filter type(s) and filter parameters to obtain an acceptable (even if not optimal) image for clinical analysis. Some known noise-suppressing filters include low-pass filters, bi-lateral filters, adaptive filters, or so forth. Low pass filters tend to smooth the image uniformly, which can suppress lesion contrast. Bi-lateral filters use the local image information to identify edges with the goal of only smoothing regions to the sides of the edge and leave the edge untouched or minimally smoothed. This is a type of edge-preserving filter, and if properly tuned may preserve lesion/organ quantitation. However, depending upon the filter parameters, edges may not be detected around some small/weak lesions/organs, in which case the small/weak lesions/organs are filtered and quantitative accuracy may be compromised. Other advanced adaptive image filters likewise require careful tuning.

The following discloses a new and improved systems and methods that address the above referenced issues, and others.

SUMMARY

In one disclosed aspect, an image processing device comprises a computer and at least one non-transitory storage medium storing instructions readable and executable by the computer to perform operations including: performing iterative processing including one of (i) iterative image reconstruction performed on projection or k-space imaging data to generate an iteratively reconstructed image and (ii) iterative image refinement performed on an input reconstructed image to generate an iteratively refined image, wherein the iterative processing produces a series of update images ending in the iteratively reconstructed or refined image; generating a difference image between two update images of the series of update images; and using the difference image in the iterative processing or in post processing performed on the iteratively reconstructed or refined image.

In another disclosed aspect, a non-transitory storage medium stores instructions readable and executable by a computer to perform an image processing method comprising: performing iterative image reconstruction on projection or k-space imaging data to generate a series of update images ending in an iteratively reconstructed image; generating a difference image between a first update image and a second update image of the series of update images; transforming the difference image into a feature image by transformation operations; and using the feature image in the iterative image reconstruction or in post processing performed on the iteratively reconstructed image.

In another disclosed aspect, an image processing method comprises: performing a first image reconstruction on projection or k-space imaging data to generate a first reconstructed image; performing a second image reconstruction on the projection or k-space imaging data to generate a second reconstructed image; generating a difference image between two images each selected from the group consisting of the first reconstructed image, an update image of the first image reconstruction, the second reconstructed image, and an update image of the second image reconstruction; and generating a final reconstructed image that combines the first reconstructed image and the second reconstructed image using the difference image.

One advantage resides in improved image quality for an iteratively reconstructed image.

Another advantage resides in improved image quality for an iteratively refined image.

Another advantage resides in providing for more accurate detection of malignant tumors or lesions.

Another advantage resides in providing for reduction of obscuring noise in clinical images.

Another advantage resides in providing for reduced likelihood of noise suppression image processing degrading or removing small lesion features.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

Figure 1:
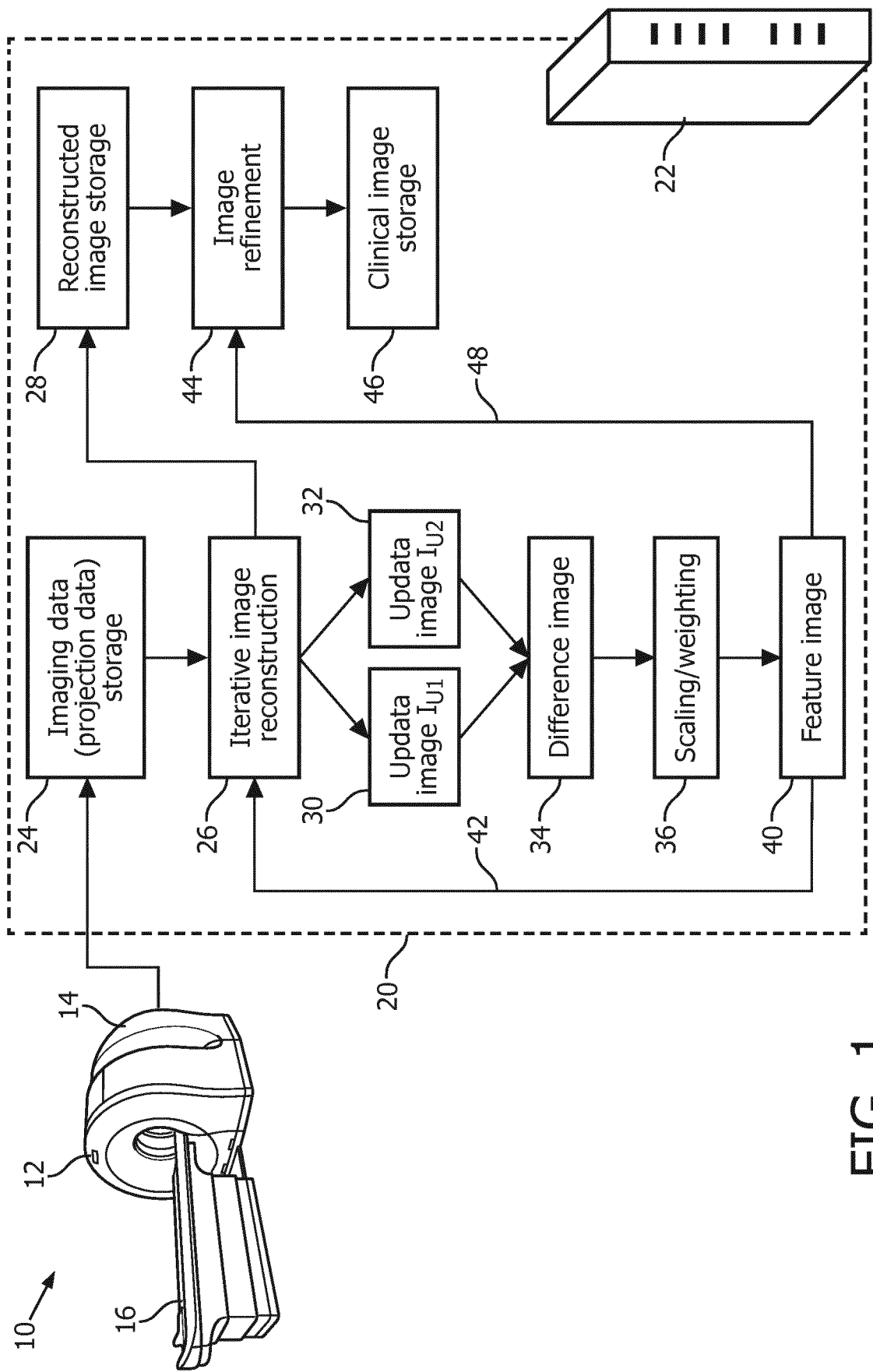
FIG. 1 diagrammatically shows an illustrative imaging system including image reconstruction and/or refinement that leverages a difference image computed using two different image updates of an iterative image reconstruction.

Image reconstruction and refinement approaches disclosed herein are premised on the insight that, rather than attempting to identify edges in an image using local spatial information (e.g. by detecting large image intensity gradients), image features as a whole (not merely the edges) can be effectively detected based on a "temporal" evolution of update images during an iterative image reconstruction or refinement process. In particular, a difference image is computed as a difference (e.g. absolute difference) between corresponding pixels of two different update images of the iterative image reconstruction or refinement process. As disclosed herein, such a difference image can, for an appropriate choice of update images, produce a difference image that captures image features such as small lesions or tumors as areal structures, rather than as edges delineating such structures as in edge-preserving or edge-enhancing image filtering. The disclosed "temporal" approaches leverage certain observations about the evolution of update images during typical iterative reconstruction of PET and SPECT images.

One observation is that large structures typically converge faster than small structures, i.e., it takes fewer number of iterations for large structures to converge. Similarly, low spatial frequency components converge faster than high spatial frequency components in the image. These observations are intuitively linked since large structures principally comprise lower spatial frequency components (e.g. in a spatial Fourier transform sense) while small structures principally comprise higher spatial frequency components. Undesirable noise is typically represented by high frequency components (higher than those needed for useful realistic structures). From these observations, it can be appreciated that a difference image employing earlier update images of an iterative image reconstruction tends to capture large features, while a difference image employing later update images tends to capture smaller features.

Another observation is that, in the case of nuclear emission images (e.g. PET or SPECT), cold regions tend to converge more slowly than hot regions. Here "cold" refers to regions of low radiopharmaceutical concentration while "hot" refers to regions of high radiopharmaceutical concentration. More generally, small lesions and sharp edges correspond to high spatial frequency image signals.

The optimal choice of update images for the difference image can be selected empirically, for example, via phantom studies to select update images for the difference image that produce the difference image with the strongest contrast for phantom features mimicking expected tumor sizes. It should be noted that the two update images that form the difference image do not necessarily need to be consecutive update images in the series of update images of the iterative reconstruction ending in the final iteratively reconstructed image. (Further, the ending iterative reconstructed image is itself defined using the iterative reconstruction termination criterion which may be variously chosen, e.g. stopping when a change metric between successive iterations is less than some minimum threshold, or stopping after a fixed number of iterations, or so forth).

A further observation is that, in the case of time-of-flight PET (i.e. TOF-PET), reconstruction from data with time-of-flight (TOF) information converges faster in general than without TOF information, since the TOF localization provides additional information to improve convergence. Hence, if PET imaging data are reconstructed using a TOF reconstruction algorithm that leverages TOF information and by a non-TOF reconstruction algorithm that does not leverage TOF information, the former is expected to converge more rapidly than the latter. More generally, different image reconstruction algorithms applied to the same imaging data may converge more or less rapidly. This observation underlies variant embodiments disclosed herein in which, rather than taking the difference image as a difference between two update images of a single image reconstruction, the difference image is between reconstructed images, or update images, of two different reconstruction algorithms applied to the same imaging data.

Further observations pertain to the relationship between convergence speed and the difference image (or the features in the difference image), as this can impact the choice of update images. Those objects with faster converge speed become close to their final reconstructed state after a few updates or iterations. On the contrary, the objects with slower converge speed remain farther away from their final reconstructed state at the time of convergence of the faster-converging objects. Thus, if the choice of update images is selected to be from the earliest updates, the difference for both faster converge objects and slower converge objects are large, and thus are not optimal to differentiate the objects. Conversely, if the choice of update images is selected to be from near the end of the iterations, the differences for both faster or slower converge objects are small, which is again not an optimal choice. In general, the optimal choice of update images is between these limits, and is preferably chosen so that the faster converging objects are close to stable (thus differences are small for these fast-converging object) while slower-converging objects are not yet stable (and hence the differences are still large) Such selection of the update images for computing the difference image thereby generates the strongest contrast for the smaller (and slower-converging) features compared to the bigger (and faster-converging) background.

Thus, in embodiments disclosed herein, the difference image is between two iterations of iterative processing (image reconstruction or refinement). Further transformations, e.g. scaling or weighting, may be applied to the difference image to generate a feature image. The feature image carries the "evolution" information of each object/organ between the iterations. The values of the same pixel or voxel in the images at different iterations are compared directly to each other, rather than being compared to its neighboring voxels in the individual images as in edge preserving or edge enhancing filtering techniques.

With reference to FIG. 1, an illustrative imaging device 10 is a combined system that includes a computed tomography (CT) gantry 12 and a positron emission tomography (PET) gantry 14, with a common subject support or couch 16 for moving a patient or other subject into a chosen gantry 12, 14 for CT or PET imaging. Advantageously, this arrangement enables, for example, acquisition of a CT image to provide anatomical information and of a PET image to provide functional information (e.g. radiopharmaceutical uptake and/or distribution in a patient). An example of a commercial PET/CT imaging device is the Vereos® digital PET/CT system available from Koninklijke Philips N.V., Eindhoven, the Netherlands. These are merely illustrative examples, and the disclosed image reconstruction and refinement approaches can be usefully employed in conjunction with CT imaging, PET imaging, single photon emission computed tomography (SPECT) imaging, magnetic resonance (MR) imaging, or so forth. The imaging device 10 acquires imaging data in the form of projection data. PET imaging data acquired using the PET gantry 14 comprise projection data in the form of lines of response (LORs) defined by detected 511 keV gamma ray pairs, optionally with time-of-flight (TOF) localization. CT imaging data acquired by the CT gantry 12 comprise projections (here absorption line integrals) along paths from x-ray tube to detector element. SPECT imaging data similarly comprise projections defined by a honeycomb or other type of collimator as linear or narrow-angle conical projections. MR imaging data are commonly collected as k-space imaging data, e.g. k-space samples acquired along a k-space trajectory (e.g., Cartesian, spiral, radial, zig-zag) defined by frequency and/or phase encoding implemented by suitably applied magnetic field gradients.

The acquired imaging data are processed by a computing device 20, e.g. a computer 22 (network server, desktop computer, or so forth) that includes or has operative access with one or more electronic data storage devices (e.g. one or more hard drives, optical disks, solid state drives or other electronic digital storage devices, or so forth). Initially, the acquired imaging data are stored at an imaging data storage device 24. In embodiments conforming with FIG. 1, the computer 22 executes suitable software to implement an iterative image reconstruction 26 that generates a reconstructed image which is stored in a storage 28. The image reconstruction 26 may also be implemented in part using application-specific integrated circuitry (ASIC) or the like. The iterative image reconstruction 26 is performed on projection imaging data (or k-space imaging data in the case of MR imaging) to generate an iteratively reconstructed image. More particularly, the iterative reconstruction 26 produces a series of update images ending in the iteratively reconstructed image which is stored in the storage 28. Some illustrative iterative image reconstruction algorithms for reconstructing PET imaging data include ordered subset expectation maximization (OSEM) image reconstruction and maximum a posteriori (MAP) image reconstruction using a quadratic prior or an edge-preserving prior (such as relative differences prior). In the case of MR imaging data, various iterative Fast Fourier Transform (FFT)-based image reconstruction algorithms can be employed, with the particular algorithm usually chosen based in part on the k-space trajectory used to acquire the MR imaging data. The imaging data that is reconstructed may be two-dimensional (2D) imaging data in which case the image reconstruction produces a 2D image (sometimes called an image slice); or, the imaging data that is reconstructed may be three-dimensional (3D) imaging data in which case the image reconstruction produces a 3D image (sometimes called a volume image).

As just noted, the iterative reconstruction 26 produces a series of update images ending (e.g., when a specified number of iterations are performed or when some other termination criterion is met) in the iteratively reconstructed image. In approaches disclosed herein, selected update images are subtracted to generate a difference image having contrast for features of interest. In illustrative FIG. 1, two selected update images 30, 32 are shown, which are indexed without loss of generality as update image i and update image j. A difference image 34 between the first update image 30 and a second update image 32 of the series of update images is generated. To avoid the possibility of negative pixel or voxel values, in some embodiments the difference image 34 is an absolute difference image between the first and second update images 30, 32 in which each pixel or voxel of the absolute difference image 34 is computed as the absolute value of the difference between corresponding pixels or voxels of the first and second update images 30, 32. In some embodiments, negative pixel or voxel values and positive values in the difference image can be used to differentiate cold and hot features of the image. Optionally, the difference image 34 is transformed by transformation operations 36 such as scaling or weighting of pixels or voxels of the difference image in order to generate a feature image 40.

The difference image 34 (optionally transformed into feature image 40) is used in the iterative reconstruction 26 (i.e., used in iterations performed subsequent to the iterations that generated the update images 30, 32) as indicated by feedback path 42. For example, the feature image 40 may serve as a prior image in subsequent iterations of the iterative image reconstruction 26. In other embodiments, the difference image 34 (optionally transformed into feature image 40) is used in optional post-processing, such as illustrative image refinement 44, that is performed on the iteratively reconstructed image to produce the final clinical image that is stored in a clinical image storage 46 such as a Picture Archiving and Communication System (PACS). Use of the feature image 40 in the post-processing 44 is diagrammatically indicated in FIG. 1 by data flow path 48.

Figure 2:
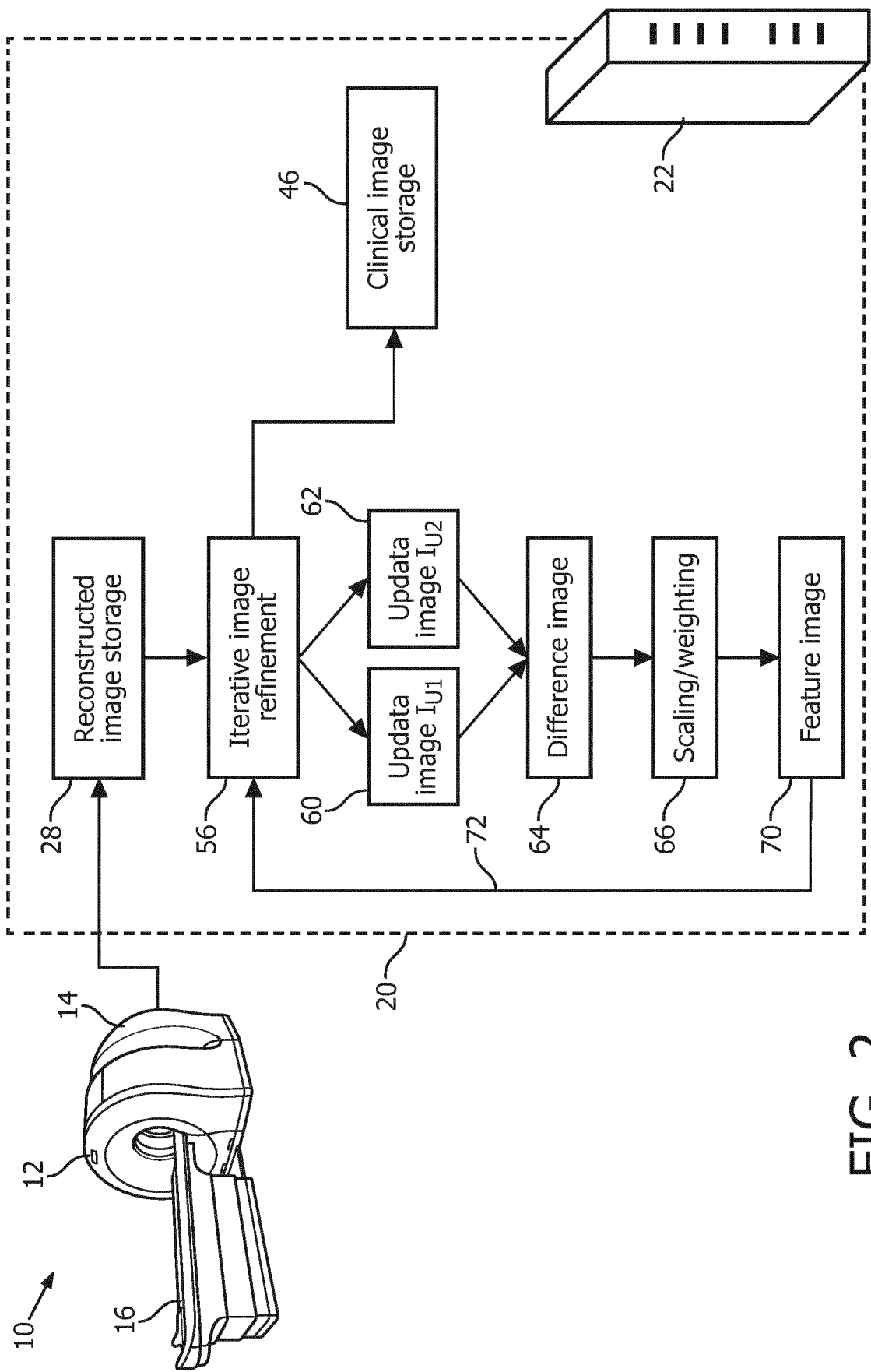
FIG. 2 diagrammatically shows an illustrative imaging system including image refinement that leverages a difference image computed using two different image updates of an iterative image refinement process.

With reference to FIG. 2, in other embodiments the difference image is generated from update images produced by iterative image refinement, rather than by iterative image reconstruction. The distinction between iterative image reconstruction and iterative image refinement is that iterative image reconstruction operates to convert imaging data (projection data or k-space data) to image data in a 2D or 3D image space; whereas, iterative image refinement operates to improve an image already extant in a 2D or 3D image space. To simplify illustration, FIG. 2 starts with the reconstructed image storage 28 that stores a reconstructed image; but it should be noted that in the embodiment of FIG. 2 the reconstructed image stored in the storage 28 may have been generated using either an iterative or a non-iterative image reconstruction algorithm. The computer 22 in the embodiment of FIG. 2 is programmed to perform an iterative image refinement 56 on the reconstructed image stored in the storage 28, which in this context of FIG. 2 is an input reconstructed image that is input to the iterative image refinement 56. The iterative image refinement 56 may, for example, be iterative filtering, iterative resolution recovery, iterative scatter correction, or so forth.

The iterative image refinement 56 is performed on the input reconstructed image to generate an iteratively refined image that is stored in the PACS or other clinical image storage 46. The iterative image refinement 56 produces a series of update images ending (e.g., when a specified number of iterations are performed or when some other termination criterion is met) in the iteratively refined image. In embodiments comporting with FIG. 2, selected update images of the series of update images produced by the iterative image refinement 56 are subtracted to generate a difference image having contrast for features of interest. In illustrative FIG. 2, two selected update images 60, 62 are shown, which are indexed without loss of generality as update image $I_{U1}$ and update image $I_{U2}$. A difference image 64 between the first update image 60 and a second update image 62 of the series of update images is generated. To avoid the possibility of negative pixel or voxel values, in some embodiments the difference image 64 is an absolute difference image between the first and second update images 60, 62 in which each pixel or voxel of the absolute difference image 64 is computed as the absolute value of the difference between corresponding pixels or voxels of the first and second update images 60, 62. In some embodiments, negative pixel or voxel values and positive values in the difference image can be used to differentiate cold and hot features of the image. Optionally, the difference image 64 is transformed by transformation operations 66 such as scaling or weighting of pixels or voxels of the difference image in order to generate a feature image 70. The difference image 64 (optionally transformed into feature image 70) is used in the iterative image refinement 56 (i.e., used in iterations of the image refinement 56 performed subsequent to the iterations that generated the update images 60, 62) as indicated by feedback path 72.

Figure 3:
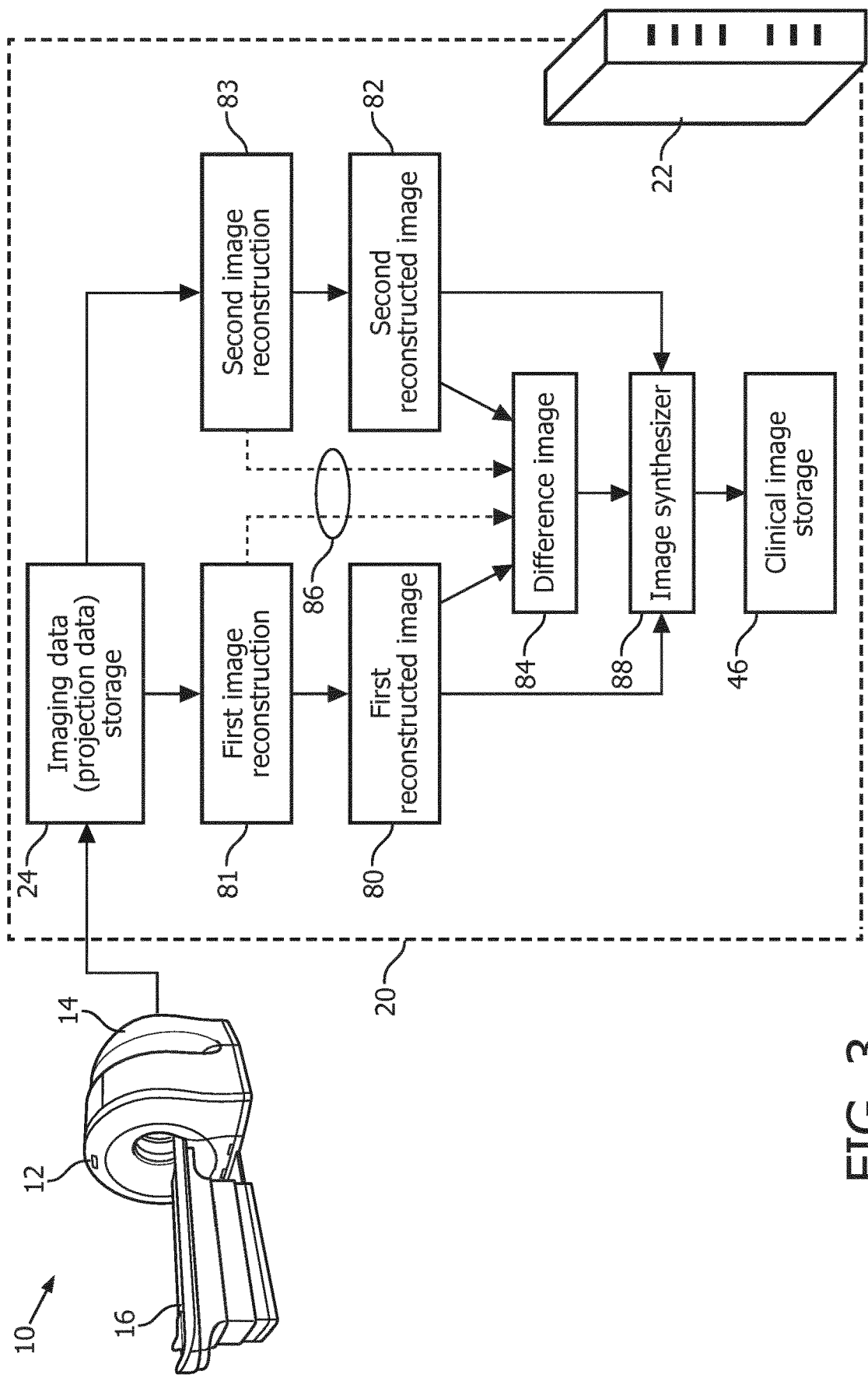
FIG. 3 diagrammatically shows an illustrative imaging system that constructs a weighted combination of two different image reconstructions, with the weighing being in accord with a difference image between the two reconstructions or between image updates of one or both image reconstructions.

With reference to FIG. 3, in another variant embodiment the difference image is between reconstructed images generated by two different (e.g., iterative or non-iterative, reconstruction with or without TOF) image reconstruction algorithms. Thus, the embodiment of FIG. 3 again operates on the imaging data (e.g. projection or k-space imaging data) acquired by the imaging device 10 and stored in the imaging data storage 24. The computer 22 is programmed to generate a first reconstructed image 80 by performing a first image reconstruction 81, and to generate a second reconstructed image 82 by performing a second image reconstruction 83 that is different from the first image reconstruction 81. For example, in the case of PET imaging data one of the image reconstruction algorithms 81, 83 may be a TOF reconstruction that leverages TOF localization data while the other may be a non-TOF reconstruction that does not use TOF localization data. In another embodiment, one of the image reconstruction algorithms 81, 83 may converge more rapidly than the other. A difference image 84 is generated as the difference between the two (differently) reconstructed images 80, 82. It is emphasized that both reconstructed images 80, 82 are generated by reconstructing the same imaging data, so that differences between the two reconstructed images 80, 82 are due to the different reconstruction algorithms 81, 83. Rather than taking the difference between the final reconstructed images 80, 82, in an alternative approach if one or both of the two image reconstruction algorithms 81, 83 are iterative reconstruction algorithm(s), then intermediate image update(s) preceding production of the (final) reconstructed image(s) 80, 82 may be used, as indicated in FIG. 3 by dotted inputs 86. For example, the difference image 84 may be between an intermediate update image of the first image reconstruction 81 and an intermediate update image of the second image reconstruction 83. Alternatively, the difference image 84 may be between two different update images of the first image reconstruction 81. As already described respecting the embodiments of FIGS. 1 and 2, the difference image 84 may be an absolute difference image, and/or may be transformed by transformation operations such as scaling or weighting into a feature image (not shown in FIG. 3). The computer 22 is further programmed to implement an image synthesizer 88 that combines the two reconstructed images 80, 82 using the difference image 84 (again, optionally transformed into a feature image by scaling, weighting, or so forth) to generate a final reconstructed image that is stored in the PACS or other clinical image storage 46. For example, the two reconstructed images 80, 82 may be combined on a pixel-by-pixel or voxel-by-voxel basis in which each pixel or voxel of the synthesized image is a weighted combination of the pixel or voxel values of the two reconstructed images 80, 82 with the weights determined by the corresponding pixel or voxel values of the difference (or feature) image 84.

It is again noted that the various computational components 26, 36, 44, 56, 66, 81, 83, 88 are implemented by suitable programming of the illustrative computer 22, although implementation of some computationally intensive aspects via ASIC, field-programmable gate array (FPGA), or other electronics is also contemplated. The computer 22 may be a single computer (server computer, desktop computer, or so forth) or an interconnected plurality of computers, e.g. a computing cluster, cloud computing resource, or so forth. It will be further appreciated that the disclosed image processing techniques may be embodied as one or more non-transitory storage media storing instruction executable by the illustrative computer 22 or by some other computer or computing resource to perform the disclosed operations. The non-transitory storage medium may, for example, comprise a hard disk or other magnetic storage medium, an optical disk or other optical storage medium, a solid state drive, flash memory or other electronic storage medium, various combinations thereof, and/or so forth.

In the following, some more detailed illustrative examples are provided in the form of phantom studies and clinical studies. These examples are directed to PET imaging, but as already described the disclosed approaches levering difference images constructed from update images produced by iterative image reconstruction or refinement are more generally useful in other types of imaging (e.g., PET, SPECT, CT, MR, or so forth).

A first example, which comports with FIG. 1, generates the feature image 40 from update images 30, 32 of iterative reconstruction 26 and uses the feature image 40 in subsequent image refinement 44, namely in post-reconstruction filtering. In this example, the imaging data were acquired using a digital PET system with TOF information and with clinically relevant count level. The PET image was reconstructed using iterative TOF list-mode OSEM reconstruction as the iterative reconstruction 26, with one iteration and four subsets (Image1, i.e. update image 30), then with two iterations and four subsets (Image2, i.e. update image 32). The difference image 34 was generated by subtracting Image1 from Image2 and taking the absolute value of each voxel of the difference image to generate the absolute difference image. Subsequent scaling/weighting 36 to generate the feature image 40 included calculating the ratio of the absolute difference image to Image1 voxel-by-voxel to generate the ratio image Ratio12, followed by clamping the voxel values to 0.15 and then dividing the image by 0.15 to obtain the feature image 40. The value of 0.15 was found empirically to be effective in this example, but a smaller or larger clamp value may be used to gauge the level of changes in the images from different reconstructions, and/or the clamp value may be adjusted based on how the iterative reconstruction is performed. As an example of the latter, when TOF is used, image convergence is typically faster than for a non-TOF reconstruction, so that one may prefer a relatively larger clamp value for TOF reconstruction; when more subsets are used in each iteration, then the difference can be larger.

It is also noted that while the update images 30, 32 in this example are from different iterations, more generally iterative image reconstruction is commonly performed with a number of subsets, and the image is updated at each subset. The term "update image" is used herein to emphasize that the images used to generate the difference image are not necessarily from different iterations, but more generally are from two different updates.

The feature image 40 generated as described above for this example has the following characteristics: (1) Any voxel that has value change of 15% (in this specific illustrative example; more generally other values may be used) or more from Image1 to Image2 has value 1; (2) Any voxel that has value change between 0 to 15% is scaled to 0-1; and (3) Small structures (e.g., lesions) and cold regions tend to have large percentage change between iterations, therefore, the corresponding voxels in the feature image have values 1 or close to 1. Accordingly, when the feature image 40 is used for the post-reconstruction image refinement 44 (filtering, in this example), the feature image 40 provides extra information. In particular, if a voxel is from a lesion then its value in the feature image 40 has value 1 or close to 1. This is used to guide the post-reconstruction processing 44 for optimized performance. For the example of post-reconstruction filtering of the image, it is desired that voxels having value 1 in the feature image 40 should not be filtered at all, or should be filtered only slightly; by contrast, voxels of the feature image 40 with value 0 or close to 0 should be filtered heavily. For values between 0 and 1, the amount of filtering should (at least approximately) scale with the feature image voxel value, i.e. the feature image voxel value serves as a weight to determine how much the voxel will be filtered. The resulting filtered image thus preserves the quantitation of the lesions and organ boundaries (due to weak or no filtering) while smoothing out the noise in the background/uniform regions (by way of strong filtering).

Leveraging of the feature image 40 as weights in a weighted combination of two image transformations $T_1$ and $T_2$ can be expressed as follows:

$$T_1(I(i))(1-f(i))+T_2(I(i))f(i) \quad (1)$$

where i indexes pixels or voxels, I(i) denotes pixels or voxels of the iteratively reconstructed image 28 and f(i) denotes corresponding pixels or voxels of the feature image, and $T_1$ and $T_2$ are two different image transformations. Specifically, $T_1$ is a strong (e.g., a Gaussian filter with a large kernel) filter and $T_2$ is a weak (e.g., a Gaussian filter with a small kernel) filter in this particular example.

Figure 4:
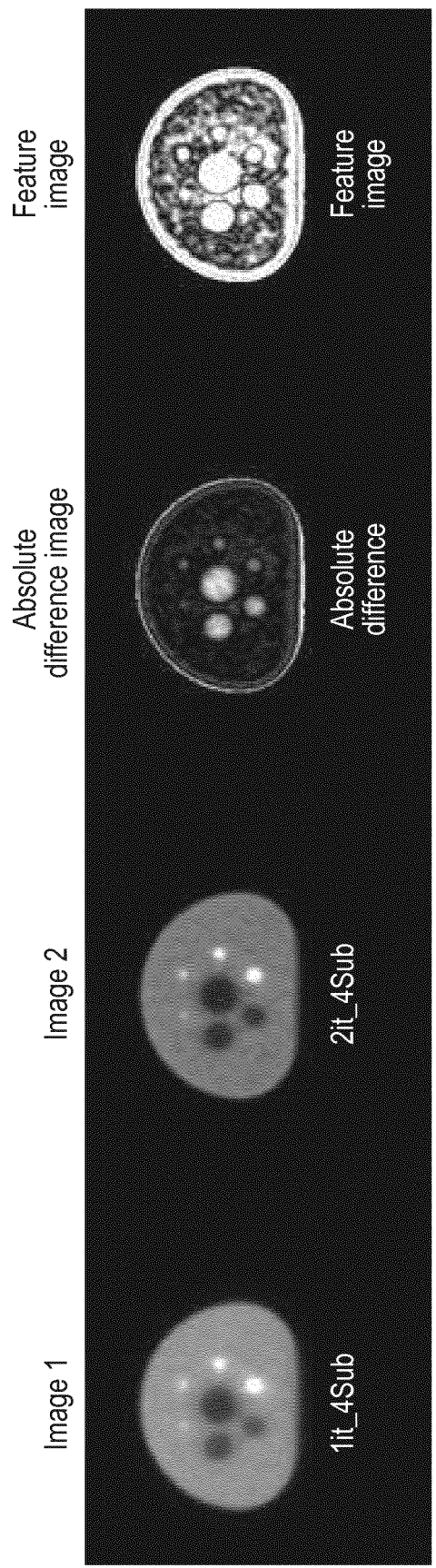
FIGS. 4-8 present image reconstruction results as described herein.
Figure 5:
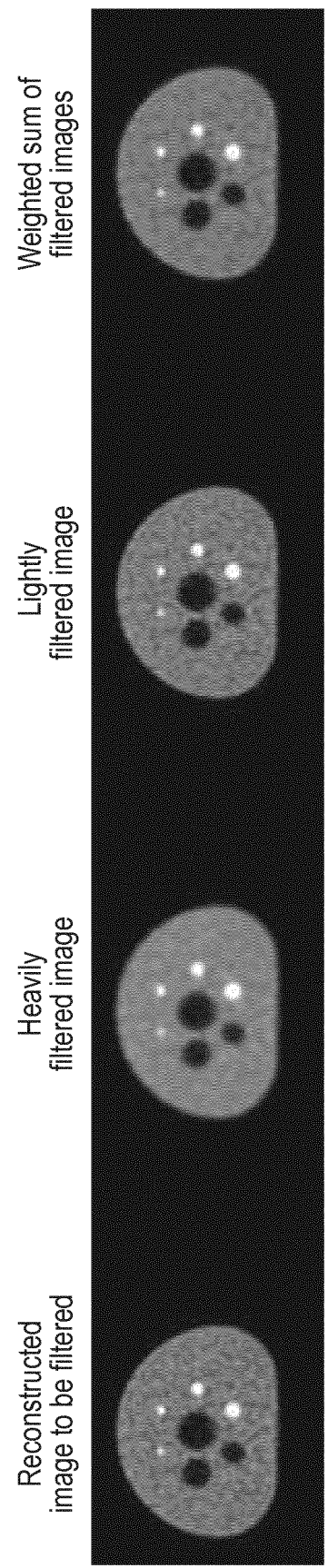

FIG. 4 displays Image1, Image2, the Absolute Difference image, and the feature image obtained for a NEMA IEC phantom study with 30 million counts. FIG. 5 illustrates a suitable filtering scheme of the NEMA IEC phantom image using the obtained feature image. The NEMA IEC phantom image was first reconstructed using a standard reconstruction protocol (IEC0). Then it was heavily filtered using three sequential box filters with window size 3 (IEC_Heavy), and slightly filtered using a box filter with kernel weight of 19 at the center and 1 at the other elements (IEC_Slight). The two filtered images were then combined using the feature image (IEC_Feature) in accordance with Equation (1) to obtain the final jointly filtered image (IEC_Joint). Using the foregoing notation, Equation (1) can be written for this task as:

$$IEC\_Joint=(1-IEC\_Feature)*IEC\_Heavy+ IEC\_Feature*IEC\_Slight \quad (2)$$

According to Equation (2), a voxel in the final image is a weighted sum of the value of the same voxel in the heavily filtered image and that in the slightly filtered image, using the voxel value in the feature image to calculate the weight. For lesions, the voxel value is 1 in the feature image, so the weight is 1 for the slightly filtered image and 0 for the heavily filtered image. Thus the lesions have the values from the slightly filtered image. In contrast, the background regions have small value in the feature image, therefore, the weight for the heavily filtered image is large. Consequently, the obtained image showed preserved spheres and significantly filtered background.

More particularly, FIG. 4 shows an example of extracting a feature image (an embodiment of the feature image 40 of FIG. 1) from images at two different OSEM iterations. Images are displayed in FIG. 4 using linear gray scale and each image was scaled to its own maximum. In FIG. 4, from left to right: Image1 (one iteration, four subsets; this is an embodiment of first update image 30 of FIG. 1), Image2 (two iterations, four subsets; this is an embodiment of second update image 32 of FIG. 1), the absolute difference (an embodiment of the difference image 34 of FIG. 1), and the feature image (an embodiment of feature image 40 of FIG. 1). The hot spheres and cold spheres of the IEC phantom as well as the lung insert in the center of the phantom (which is cold) exhibited large changes between Image1 and Image2. The corresponding voxels of such objects in the feature image had high values. The uniform background (low frequency components) of the imaged phantom had low values (more black area in the gray scale display) in the feature image, indicating relatively small change from Image1 to Image2 due to faster convergence than the spheres (higher frequency components).

FIG. 5 shows an example of using the feature image from FIG. 4 to post-filter the NEMA image reconstructed using the standard reconstruction protocol (three iterations, 17 subsets). From left to right: the NEMA image to be filtered (this is an embodiment of the reconstructed image stored in the storage 28 of FIG. 1), a heavily filtered image (box filter with window size 3, filter three times sequentially), a slightly filtered image (a box filter with window size 3 but with center of 19 and 1 for the rest), and the jointly filtered image using the feature image (i.e. the weighted sum of the heavily filtered and lightly filtered image combined using Equation (2)). The jointly filtered image significantly suppressed the noise in the background while still preserving the sphere quantitation.

Next, an imaging example is described in which a final reconstructed image is synthesized from two different image reconstructions. In regularized reconstruction, different reconstruction schemes may lead to different image quality. For example, when using a quadratic prior image, regularized reconstruction leads to more smoothed images, but this approach has the disadvantage that some small structures may also be smoothed out. Conversely, when using an edge-preserving prior image, the edges in the image are preserved, but some areas may not be sufficiently smoothed if the noise level is relatively high in those areas.

In this example, two reconstructed images are generated: one using a quadratic prior to obtain a (heavily) smoothed image, and the other using an edge-preserving prior to obtain an edge-preserved image. Using a feature image, these two images are combined in weighted fashion to synthesize the two reconstructed images into one joint image. A suitable weighted combination is:

$$I_1(i)(1-f(i))+I_2(i)f(i) \quad (3)$$

where i indexes pixels or voxels, $I_1(i)$ and $I_2(i)$ denotes pixels or voxels of two different images generated by two different image reconstruction or refinement algorithms applied to the projection data (or k-space data in the case of MR image reconstruction), f(i) denotes corresponding pixels or voxels of the feature image. At least one of $I_1(i)$ and $I_2(i)$ is an iteratively reconstructed image, and a feature image is generated from two update images of the iterative reconstruction. In this example, the feature image was generated in the same way as the NEMA IEC phantom study in FIG. 4, but using the real patient data (i.e. there is a trial recon to extract features) to demonstrate that once the mechanism of generating the feature images is established (through IEC phantom studies), the mechanism is also application to patient studies.

If one reconstructed image is heavily smoothed (e.g. using a quadratic prior) and the other is edge-preserving (e.g. using an edge-preserving prior) then the combined image provides both the edge preserving advantage of the edge-preserved image and the smoothing advantage of the smooth image since the feature image provides extra information such as spatial frequency (i.e. how fast it changes locally) and object boundary information. This extra information is used to decide which region (or pixels) should be more heavily smoothed or more lightly smoothed.

Figure 6:
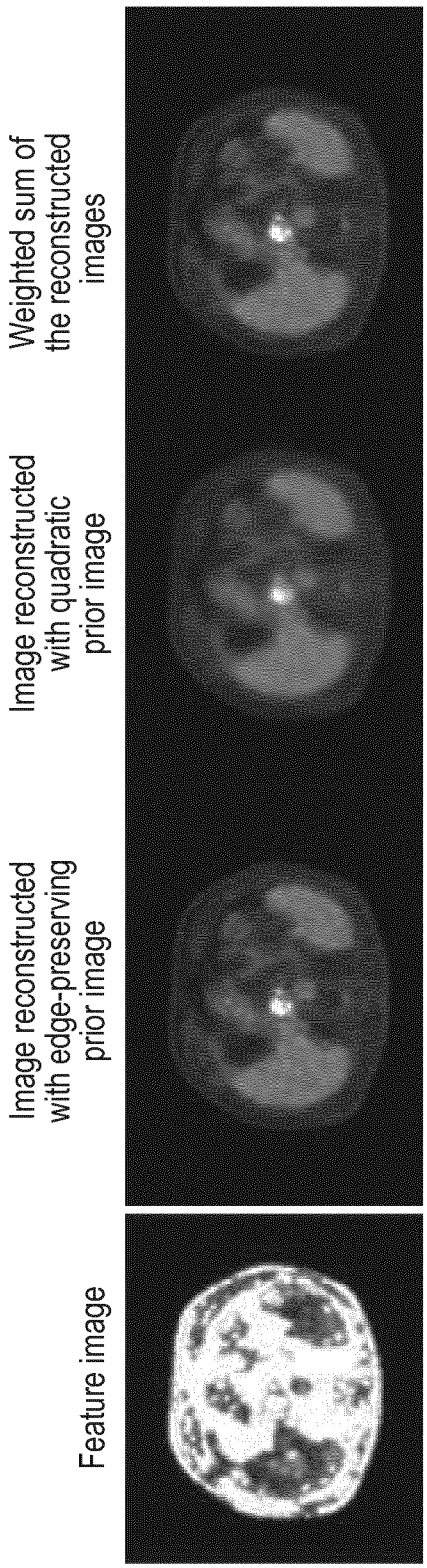
Figure 7:
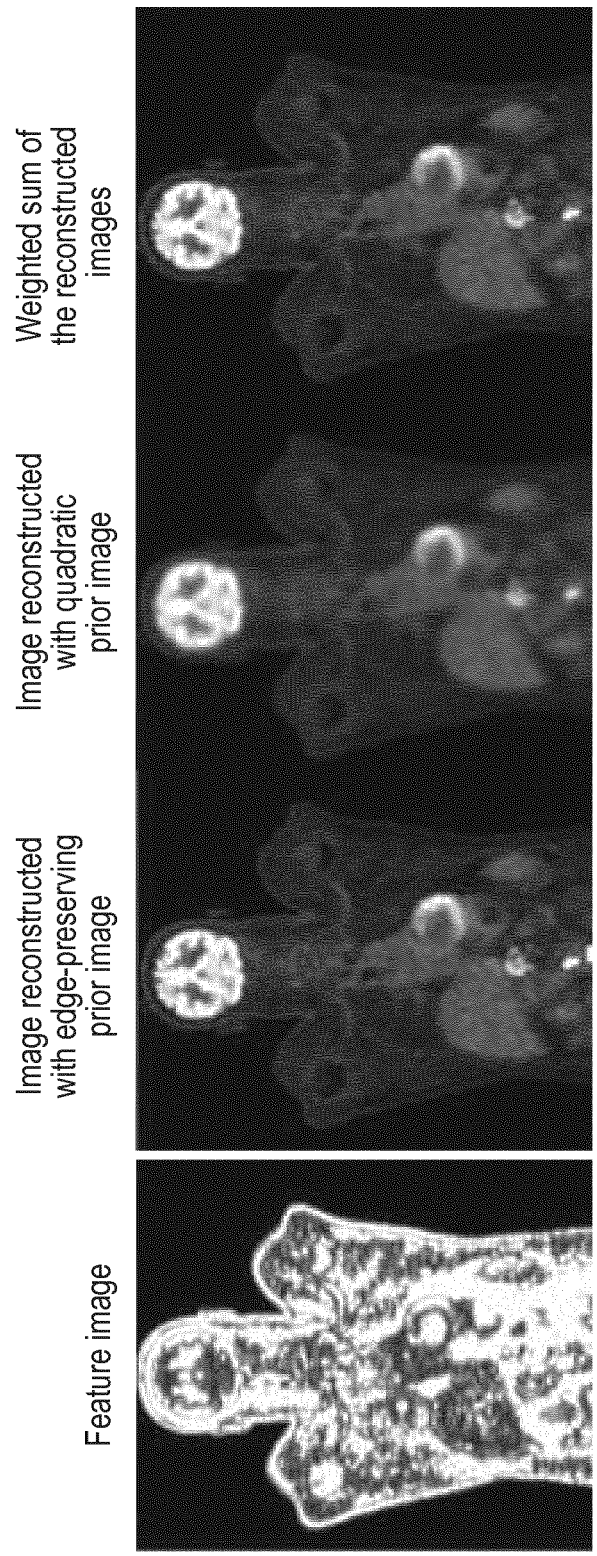

FIG. 6 shows transaxial slices of images of a patient study that illustrate the effectiveness of the foregoing synthesis of images generated using quadratic and edge-preserving priors, respectively. FIG. 7 illustrates the effect of this synthesis for the same patient study using coronal slices. The liver region was significantly filtered in the synthesized image as compared to the edge-preserving image, but the small structures, such as the hot spot in the center) was preserved as compared to the smooth image using a quadratic prior More particularly, FIG. 6 shows the feature image (leftmost image in FIG. 6) used to synthesize a MAP reconstructed image using an edge-preserving prior (second image from left) and a MAP reconstructed image using a (non-edge-preserving) quadratic prior (third image from left, i.e. "smooth" image). Again, the feature image was generated in the same way as for the NEMA IEC phantom study above. The rightmost image in FIG. 6 was the synthesized image combined using Equation (3) with the feature image (leftmost image of FIG. 6) providing the f(i) weights. The synthesized image exhibits preservation of the small structures in the image and filtering of the soft tissue (indicated by the black regions in the feature image). This final image was better than either of the MAP images (middle two images of FIG. 6).

FIG. 7 shows coronal slices of the same patient as in FIG. 6, illustrating the effectiveness of using the feature image (leftmost image in FIG. 7) to obtain the final synthesized image (rightmost image in FIG. 7) that has both the advantage of edge-preservation of small features in the edge-preserving image (second image from the left, MAP reconstruction using an edge-preserving prior) and the advantage of smoothness of the liver and mediastinum of the smooth image (third image from the left, MAP reconstruction using quadratic prior).

The same synthesis approach can be applied to generate a feature image-weighted combination of two images generated using two different image refinement processes. For example, an edge adaptive anisotropic diffusion filter (ADF) can be used with two different parameter settings to obtain an edge-preserving image and a smooth image, respectively. A feature image may then be used to synthesis the two images to obtain the final image. In any such approach, the feature image is generated from a difference image generated by subtracting two update images of iterative image processing (either an iterative reconstruction or an iterative image refinement) with the update images selected to emphasize the features of interest.

In a further example, a feature image is used to provide reconstruction parameter guidance. In regularized reconstruction, one can use a quadratic prior of variable strength (guided by the feature image) to guide the regularization. For example, values of 1 in the feature image would reduce the smoothing strength of quadratic prior, and lower values would gradually enable it. The resulting image reconstruction will apply selective regularization using the extra information from the feature image, leading to optimized regularization in one reconstruction (as compared to performing two different reconstructions as in the example described with reference to FIGS. 6 and 7).

Figure 8:
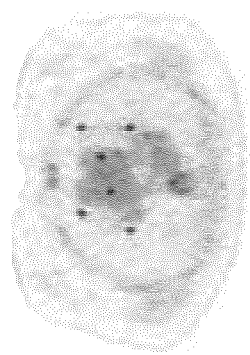
Figure 8:
Figure 8:
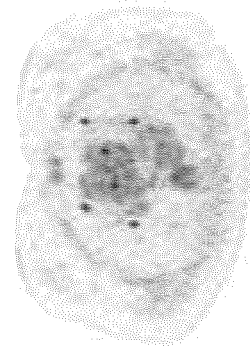

FIG. 8 illustrates an example of this single-reconstruction approach. Using a feature image for selective regularization in regularized reconstruction obtained advantageous lesion quantitation preservation and noise reduction in the background. The leftmost image in FIG. 8 shows a regularized reconstruction using classical OSEM reconstruction without noise control. Lesions were sharp but background was noisy. The middle image in FIG. 8 shows a regularized reconstruction using a quadratic prior for effectively suppressed noise in the background—but small lesions were also smoothed, and the contrast was decreased significantly. The rightmost image in FIG. 8 is a regularized image where the strength of the quadratic prior was modulated by using a feature image to guide the selective regularization voxel-by-voxel and to preserve the edges. Once again, the feature image was created in the same way as for the NEMA IEC phantom study above. This approach provided comparable lesion preservation as the edge-preserving image with significantly reduced/suppressed background noise, particularly in the warm regions. In another example, one can use combinations of different priors such as edge preserving prior in regions where the feature image has high values; for voxels with small values in the feature image, one can use a stronger low-pass quadratic prior.

Figure 9:
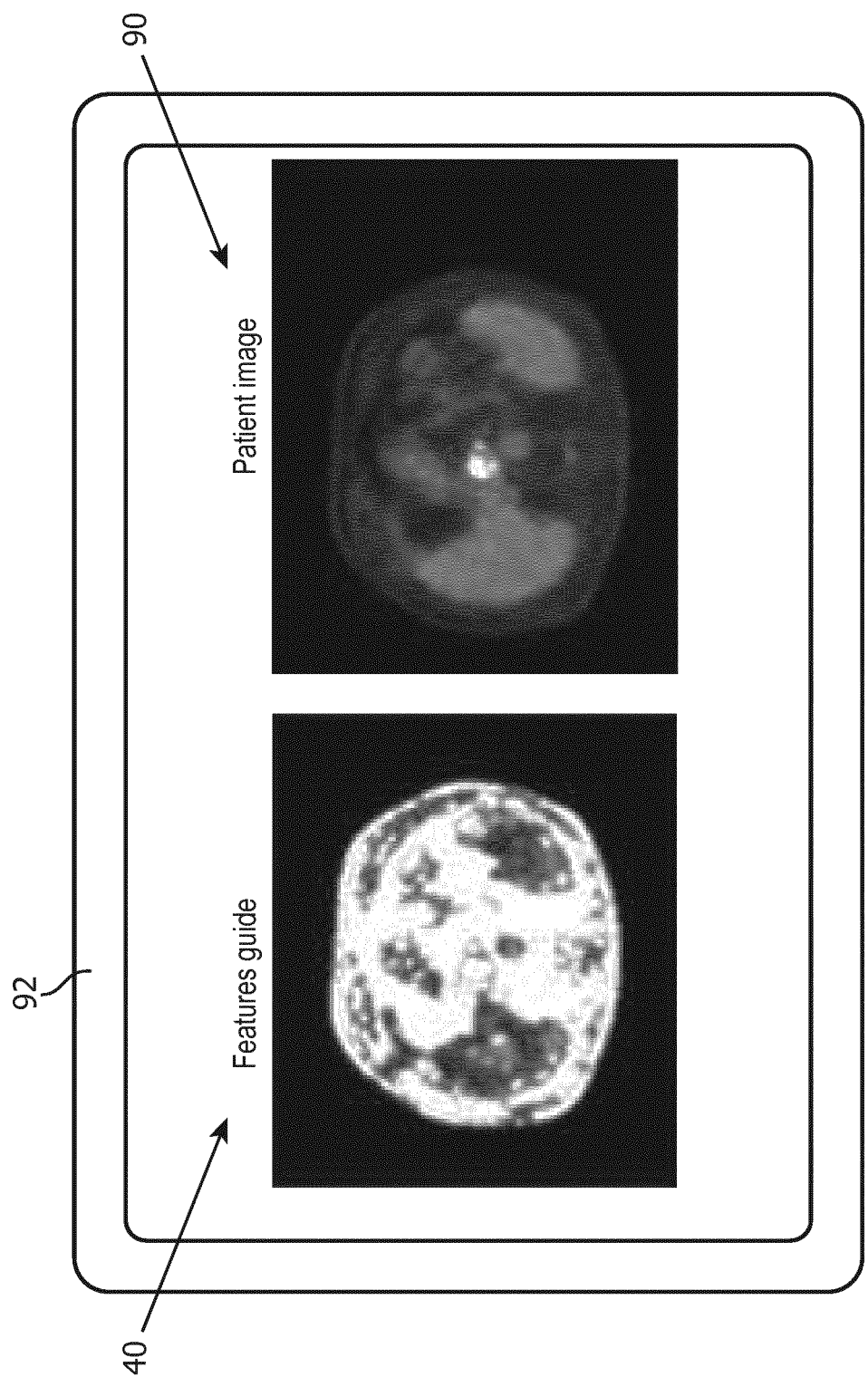
FIG. 9 illustrates use of a feature image as disclosed herein displayed to provide visual guidance as to detected features.

With reference now to FIG. 9, the feature image can additionally or alternatively be displayed to provide the physician or other medical professional with visual guidance as to the features detected via the difference image. In illustrative FIG. 9, the feature image 40 is displayed side-by-side with a clinical image 90 on a display device 92, e.g. the LCD, plasma, or other graphical display component of a radiology workstation, oncology workstation, or other computer device, films etc. used by the medical professional to review medical images. The clinical image 90 may optionally be generated leveraging the feature image 40 as disclosed herein, or may be generated without resort to the feature image 40. As an example of the latter, the clinical image 90 may be generated by MAP reconstruction using an edge-preserving prior. This can lead to significant noise retention—however, the medical professional is assisted in detecting lesions in spite of this noise by reference to the "features guide" which is the displayed feature image 40.

Additionally or alternatively, the feature image 40 may be used in scoring lesions identified by the medical professional. Such scoring employ various factors or metrics in providing a quantitative assessment of the likelihood that the feature identified as a lesion by the medical professional is indeed a lesion, rather than being noise or some other image artifact. Since the feature image using the illustrative scaling/weighting scheme has pixel or voxel values near 1 for features and values near zero otherwise, the sum of pixel or voxel values of the feature image 40 within the area or volume identified as a lesion by the physician is a metric of how likely it is that the lesion identification is correct. Thus, for example, the average pixel or voxel value over the area or volume of the lesion:

$$\frac{1}{|L|}\sum_{i\in L} f(i) \quad (4)$$

provides a lesion likelihood metric. In Equation (4), L represents the identified lesion, the summation is over all pixels or voxels i within this lesion (i∈L), and the notation |L| denotes the total number of pixels or voxels in the lesion L. The likelihood metric of Equation (4) may optionally be combined with other factors or metrics, e.g. whether the identified lesion L is wholly within an organ expected to contain the lesion (e.g. whether it is within the prostate in the case of a prostate cancer analysis), a measure based on the image texture in the lesion L, and/or so forth.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. An image processing device comprising:
a computer; and
at least one non-transitory storage medium storing instructions readable and executable by the computer to perform operations including:
performing iterative processing including one of:
(i) iterative image reconstruction performed on projection or k-space imaging data to generate an iteratively reconstructed image, and
(ii) iterative image refinement performed on an input reconstructed image to generate an iteratively refined image;
wherein the iterative processing produces a series of update images ending in the iteratively reconstructed image;
selecting two update images from the series of update images;
generating a difference image between the two selected update images; and
using the difference image in the iterative processing or in post-processing performed on the iteratively reconstructed or refined image.

2. The image processing device of claim 1 wherein the difference image is an absolute difference image between the two update images in which each pixel or voxel of the absolute difference image is computed as the absolute value of the difference between corresponding pixels or voxels of the two update images.

3. The image processing device of claim 1 wherein the difference image between the two update images has pixel or voxel values that indicate large positive changes and large negative changes between the two update images.

4. The image processing device of claim 1, wherein the two update images are each generated by the iterative processing prior to generating the iteratively reconstructed or refined image.

5. The image processing device of claim 1 wherein the performed operations further include:
transforming the difference image into a feature image by transformation operations including at least scaling or weighting pixels or voxels of the difference image;
wherein the using comprises using the feature image in the iterative processing or in the post-processing performed on the iteratively reconstructed or refined image.

6. The image processing device of claim 5 further comprising:
a display component;
wherein the performed operations further include simultaneously displaying, on the display component, both the feature image and a clinical image.

7. The image processing device of claim 5 wherein the using comprises:
post-processing the iteratively reconstructed or refined image using the feature image according to the image transformation:

$$T_1(I(i))(1-f(i))+T_2(I(i))f(i)$$

where i indexes pixels or voxels, I(i) denotes pixels or voxels of the iteratively reconstructed or refined image and f(i) denotes corresponding pixels or voxels of the feature image, and $T_1$ and $T_2$ are two different image transformations.

8. The image processing device of claim 7 wherein the two different image transformations $T_1$ and $T_2$ are two different image filters.

9. The image processing device of claim 5 wherein the using comprises:
post-processing the iteratively reconstructed or refined image using the feature image according to the image transformation:

$$I_1(i)(1-f(i))+I_2(i)f(i)$$

where i indexes pixels or voxels, $I_1(i)$ and $I_2(i)$ denotes pixels or voxels of two different images generated by two different image reconstruction or refinement algorithms applied to the projection or k-space imaging data or to the input reconstructed image, f(i) denotes corresponding pixels or voxels of the feature image, and one of $I_1(i)$ and $I_2(i)$ is the iteratively reconstructed or refined image generated by the iterative processing (26, 56).

10. The image processing device of claim 5 wherein the iterative processing includes iterative image reconstruction performed on projection or k-space imaging data to generate the iteratively reconstructed image.

11. The image processing device of claim 10 wherein the using comprises:
using the difference image in iterations of the iterative image reconstruction performed subsequent to producing the two update images.

12. The image processing device of claim 10 wherein the using comprises:
performing iterations of the iterative image reconstruction subsequent to producing the two images using a regularization prior with the strength of the prior modulated according to the difference image.

13. An image processing device, comprising:
a computer; and
at least one non-transitory storage medium storing instructions readable and executable by the computer to perform operations including:
performing iterative processing including iterative image refinement performed on an input reconstructed image to generate an iteratively refined image, wherein the iterative processing produces a series of update images ending in the iteratively reconstructed image;
generating a difference image between two update images of the series of update images; and
using the difference image in the iterative processing or in post-processing performed on the iteratively refined image.

14. The image processing device of claim 13 wherein the using comprises:
using the difference image in iterations of the iterative image refinement performed subsequent to producing the two update images.

15. A non-transitory storage medium storing instructions readable and executable by a computer to perform an image processing method comprising:
performing iterative image reconstruction on projection or k-space imaging data to generate a series of update images ending in an iteratively reconstructed image;
generating a difference image between a first update image and a second update image of the series of update images;
transforming the difference image into a feature image by transformation operations including at least scaling or weighting pixels or voxels of the difference image; and
using the feature image in post-processing performed on the iteratively reconstructed image.

16. The non-transitory storage medium of claim 15 wherein the difference image is an absolute difference image between the first and second update images in which each pixel or voxel of the absolute difference image is computed as the absolute value of the difference between corresponding pixels or voxels of the first and second update images.

17. The non-transitory storage medium of claim 15 wherein the difference image between the first and second update images has pixel or voxel values that indicate large positive changes and large negative changes between the two update images.

18. The non-transitory storage medium of claim 15 wherein the using comprises:
post-processing the iteratively reconstructed image using the feature image according to the image transformation:

$$T_1(I(i))(1-f(i))+T_2(I(i))f(i)$$

where i indexes pixels or voxels, $I(i)$ denotes pixels or voxels of the iteratively reconstructed image and $f(i)$ denotes corresponding pixels or voxels of the feature image, and $T_1$ and $T_2$ are two different image transformations.

19. The non-transitory storage medium of claim 15 wherein the using comprises:
using the feature image in iterations of the iterative image reconstruction performed subsequent to producing the first and second update images.

20. The non-transitory storage medium of claim 19 wherein the using comprises:
performing iterations of the iterative image reconstruction subsequent to producing the first and second update images using the feature image as a regularization prior image.

21. The non-transitory storage medium of claim 19 wherein the using comprises:
performing iterations of the iterative image reconstruction subsequent to producing the first and second update images using the feature image as a weighting image for weighting a regularization prior image.

22. An image processing method comprising:
performing a first image reconstruction on projection or k-space imaging data to generate a first reconstructed image using a first image reconstruction algorithm;
performing a second image reconstruction on the projection or k-space imaging data to generate a second reconstructed image using a second image reconstruction algorithm that is different from the first image reconstruction algorithm;
generating a difference image between two images each selected from the group consisting of the first reconstructed image, an update image of the first image reconstruction, the second reconstructed image, and an update image of the second image reconstruction; and
generating a final reconstructed image that combines the first reconstructed image and the second reconstructed image using the difference image.

23. The image processing method of claim 22 wherein the difference image is between the first reconstructed image and the second reconstructed image.

24. The image processing method of claim 22 wherein the difference image is between the two different update images of the first image reconstruction.

* * * * *